(12) United States Patent
Biteau (10) Patent No.: US 8,562,772 B2
(45) Date of Patent: *Oct. 22, 2013

(54) PROCESS FOR APPLYING A LAYERED STRUCTURE ON A LENS

(75) Inventor: John Biteau, St-Petersburg, FL (US)

(73) Assignee: Essilor International (compagnie Generale d'optique), Charenton le Pont (FR)

(*) Notice: Subject to any disclaimer, the term of this patent is extended or adjusted under 35 U.S.C. 154(b) by 141 days.

This patent is subject to a terminal disclaimer.

(21) Appl. No.: 13/185,529

(22) Filed: Jul. 19, 2011

(65) Prior Publication Data

US 2012/0013979 A1   Jan. 19, 2012

Related U.S. Application Data (63) Continuation-in-part of application No. 12/300,796, filed as application No. PCT/US2006/018590 on May 15, 2006, now Pat. No. 8,002,925.

(51) Int. Cl.

| | | |
|---|---|---|
| *A61F 13/15* | (2006.01) |
| *B29C 65/00* | (2006.01) |
| *B32B 37/00* | (2006.01) |
| *B31B 1/60* | (2006.01) |
| *G21C 21/00* | (2006.01) |
| *B29D 11/00* | (2006.01) |
| *G02B 6/00* | (2006.01) |
| *G02B 6/10* | (2006.01) |
| *G02B 5/30* | (2006.01) |
| *G02B 5/32* | (2006.01) |
| *G02B 3/00* | (2006.01) |

(52) U.S. Cl.
USPC ............. 156/163; 156/160; 156/60; 264/5; 264/1.1; 264/1.24; 264/1.31; 264/1.32; 264/1.7; 264/2.7

(58) Field of Classification Search
USPC ............. 156/163, 160, 60; 264/0.5, 1.1–2.7
See application file for complete search history.

(56) References Cited

U.S. PATENT DOCUMENTS

| | | | | |
|---|---|---|---|---|
| 3,026,232 A | * | 3/1962 | Finch | 156/212 |
| 3,322,598 A | | 5/1967 | Marks et al. | |
| 4,707,208 A | * | 11/1987 | Crumbach et al. | 156/285 |
| 5,851,328 A | * | 12/1998 | Kohan | 156/102 |
| 6,177,032 B1 | * | 1/2001 | Smith et al. | 264/1.34 |
| 2009/0152747 A1 | * | 6/2009 | Hsu | 264/1.32 |

FOREIGN PATENT DOCUMENTS

EP   0100265   2/1984

* cited by examiner

*Primary Examiner* — Christopher Schatz
*Assistant Examiner* — Matthew Hoover
(74) *Attorney, Agent, or Firm* — Occhiuti Rohlicek & Tsao LLP (57) ABSTRACT

This invention relates to an improvement for applying a layered structure onto a convex surface of a lens. After thermoforming the layered structure, a curvature direction of the layered structure is inverted. The structure is then applied on the lens surface by continuously pushing the structure against the lens surface, starting from a contact point between a convex surface of the structure and the convex surface of the lens. The curvature direction of the layered structure is then inverted again, so that it recovers the curvature direction that resulted from thermoforming. Stresses within the layered structure are then reduced, and the structure can be assembled with the lens without defects.

23 Claims, 4 Drawing Sheets

PROCESS FOR APPLYING A LAYERED STRUCTURE ON A LENS

CROSS-REFERENCE TO RELATED APPLICATIONS

This application is a continuation-in-part of U.S. patent application Ser. No. 12/300,796 filed on Nov. 14, 2008, which is the National Stage of International Application No. PCT/US2006/018590, filed on May 15, 2006. The contents of both applications are hereby incorporated by reference in their entirety.

BACKGROUND

The invention relates to a process for applying a layered structure on a convex surface of a lens. It may be implemented with an ophthalmic lens, in particular.

It is often useful to fit a lens with a film on a surface of that lens, for obtaining a resulting lens which has a desired property. For example, the film may be a polarizing film, a contrast-enhancing film, a photochromic film, etc. Because the surface of the lens is curved, the film cannot be directly applied on the lens when it has a planar shape. Indeed delaminations, cracks and/or wrinkles would then occur, due to the difference in curvature between the film and the lens surface. Therefore, it is necessary to preform the film, so as to provide it with an initial curvature before application on the lens surface.

It is also known to provide a layered structure with a curved shape, so that the layered structure has a first surface which is concave and a second surface which is convex. Then, the first surface of the layered structure is brought into contact with the lens surface at an initial contact point, preferably in a middle part of the lens surface. Starting from the initial contact point, the first surface of the layered structure is pushed against the lens surface via pressure applied on the second surface of the layered structure. The contact between the first surface of the layered structure and the lens surface continuously expands radially as pressure is increased. In known implementations of such process, a peripheral edge of the layered structure is hold during the application on the lens, and the structure is pushed against the lens with a resilient pad.

But despite the layered structure is initially provided with a curved shape, the lens fitted with the layered structure exhibits wrinkles in the structure near in a peripheral part of the lens, or cracks in the layered structure in the middle part of the lens. Such defects occur especially when the curvature radius of the lens surface is small, typically less than 75 mm (millimeters).

SUMMARY

An object of the invention is to improve a process of the type just described, so that the resulting lens fitted with the layered structure does not exhibit defects.

To this end, the invention proposes a process for applying a layered structure on a convex surface of a lens, which comprises the following steps:

/a/ providing the layered structure with a planar shape;

/b/ thermoforming the layered structure so that it becomes curved with a first surface being concave and a second surface being convex;

/c/ inverting the curvature of the layered structure so that said first surface turns convex and said second surface turns concave;

/d/ bringing the first surface of the layered structure in contact with the lens surface at an initial contact point; and /e/ starting from the initial contact point, applying the first surface of the layered structure against the lens surface via pressure applied on the second surface of the layered structure, the first and second surfaces of the layered structure turning back to concave shape and convex shape, respectively, at a peripheral border of an increasing contact zone.

The quality of the assembly obtained is compatible with optical applications, in particular with an ophthalmic use of the lens fitted with the layered structure. Indeed, no wrinkle, no crack and no delamination of the layered structure appear after the application on the lens surface. Thus, the assembly obtained of the lens with the layered structure thereon exhibits no visible defect.

Such optical quality of the assembly results from the following features of the invention.

First, the layered structure is thermoformed in step /b/, so that it acquires a curved shape. Reduced stresses are then created within the layered structure during step /e/, in comparison with a planar layered structure being applied on the lens surface without thermoforming.

Second, the curvature of the layered structure is inverted twice, in step /c/ and during step /e/. Therefore, the curvature of the layered structure in the assembly is of same direction as that resulting from the thermoforming step /b/. Put another way, each of the first and second surfaces of the layered structure is concave or convex, respectively, in the final assembly as it is just after thermoforming. This also results in reduced stresses remaining within the layered structure after it is applied on the lens.

According to a first improvement of the invention, substantially no pressure is applied on the second surface of the layered structure out of the increasing contact zone during step /e/. Then, the peripheral part of the layered structure can accommodate residual stretches that occur during step /e/ without making defects. Furthermore, residual stresses are more spread in the layered structure after step /e/, so it is less likely that such stresses cause local defects.

According to a second improvement of the invention, step /e/ may be carried out with the layered structure heated. The layered structure is thus softened and can accommodate more important strains and/or variations in shape without forming defects during and after step /e/.

A first advantage of a process according to the invention is that it can be implemented rapidly. In particular, it is compatible with an implementation in real-time with customer demand, for example at an ophthalmic retailer. The retailer needs to have a layered structure in stock that corresponds to a desired optical function, and this layered structure is applied on a lens that corresponds to the ametropy of a customer, using a process according to the invention.

A second advantage of a process according to the invention is that it does not require complex or expensive tools for being implemented, and short technical training is sufficient for the operator.

For the purpose of the invention, the layered structure may be a single material layer or a stack of several layers which has a general layer shape. In particular, the layered structure may be a polarizing film combined with one or two protective films, which are laminated on one side or either side of the polarizing film.

The layered structure with planar shape that is provided in step /a/ may be cut in a large sheet provided conveniently in roller form.

According to a preferred implementation the invention, steps /d/ and /e/ are carried out with an adhesive layer provided between the lens surface and the first surface of the layered structure. Hence, a permanent assembly of the lens with the layered structure can be obtained. The adhesive layer may advantageously comprise a material of pressure-sensitive adhesive type, so that the structure is directly stuck on the lens surface during step /e/. The adhesive layer can be present either on the lens surface or on the layered structure prior to lamination.

A process according to the invention makes it possible to combine a layered structure with a lens even when the curvature of the structure after thermoforming is different from that of the lens surface. The curvature of the layered structure is automatically modified during step /e/ so that the final curvature of the layered structure matches the curvature of the lens surface.

Preferably, step /b/ may be carried out so that, between steps /b/ and /c/, a curvature of the layered structure at least one point in the first surface of the layered structure is greater than or equal to a curvature of the lens surface at a point in the lens surface which corresponds to the at least one point in the first structure surface after step /e/. In the frame of the invention, curvature refers to the average of the two curvatures that are defined at any point in a surface along two perpendicular directions. Mathematically, curvature is equal to the inverse of the curvature radius: curvature gets higher when curvature radius is reduced. Such relation between the respective curvatures of the layered structure and the lens surface ensures further that the structure remains applied properly on the lens in the peripheral part of this latter after step /e/. When the lens surface has a constant curvature, the layered structure may have, just after step /b/, a curvature which is greater than or equal to the curvature of the lens surface at any point of the first surface of the layered structure.

In particular, the invention is useful for applying a layered structure on a lens which has a high curvature. The curvature radius of the lens surface may be, below 305 millimeters, preferentially below 100 millimeters, and in particular, less than 75 millimeters.

The invention is also useful for applying a layered structure on a progressive addition lens. In this case, the lens surface exhibits a curvature which continuously varies along the surface. For an ophthalmic lens, base curvature and power addition are parameters that are currently used for defining a progressive surface. They define the curvature radii of the lens surface at a far vision point and at a near vision point. For a progressive addition lens, the curvature of the lens surface at the near vision point is higher than the curvature at the far vision point. Then, the inventors have found that the assembly of the lens with the layered structure is defect-free in particular when the layered structure has, just after step /b/, a curvature that is greater than the curvature of the lens surface at the far vision point.

In some aspects, a process is provided for applying a layered structure on a convex surface of a lens, wherein the lens is an ophthalmic lens and the layered structure includes a circular-polarizing layer efficient for at least one wavelength of visible light. The process includes the following steps: /a/ providing the layered structure with a planar shape; /b/ thermoforming the layered structure so that it becomes curved with a first surface being concave and a second surface being convex; /c/ inverting the curvature of the layered structure so that said first surface turns convex and said second surface turns concave ; /d/ bringing the first surface of the layered structure in contact with the lens surface at an initial contact point; and /e/ starting from the initial contact point, applying the first surface of the layered structure against the lens surface via pressure applied on the second surface of the layered structure, the first and second surfaces of the layered structure turning back to concave shape and convex shape, respectively, at a peripheral border of an increasing contact zone.

The process may include one or more of the following additional features and/or steps: The layered structure including the circular-polarizing layer is suitable for the lens such that after step /e/ the lens is capable of filtering a light based on a circular polarization of said light. The process may be used to provide a pair of spectacles that include a frame and two lenses obtained by implementing the process, wherein each lens of the pair of lenses is capable of transmitting light with an initial circular polarization opposed to that of the other lens of the pair of lenses. The pair of spectacles is suitable for TV watching with stereoscopic vision with image selection based on circular light-polarization. Step /e/ is carried out so that substantially no pressure is applied on the second surface of the layered structure out of the increasing contact zone. Step /e/ is carried out with the layered structure heated. A temperature of the layered structure is equal or at least 75° C. during step /e/. The surface of the lens has a curvature radius below 305 millimeters, preferentially below 100 millimeters, and particularly less than 75 millimeters. Steps /d/ and /e/ are carried out with an adhesive layer provided between the lens surface and the first surface of the layered structure. The adhesive layer is applied on the lens surface and/or on the first surface of the layered structure. The adhesive layer comprises a material of pressure-sensitive adhesive type. Pressure is applied on the second surface of the layered structure during step /e/ via a resilient membrane being inflated and pressing on the second surface of the layered structure within the increasing contact zone. Step /b/ is carried out so that, between steps /b/ and /c/, a curvature of the layered structure at least one point in the first surface of said layered structure is greater than or equal to a curvature of the lens surface at a point in said lens surface which corresponds to said at least one point in the first surface of the layered structure after step /e/. The lens surface has a constant curvature, and wherein step /b/ is carried out so that, between steps /b/ and /c/, the layered structure has a curvature greater than or equal to the curvature of the lens surface at any point in the first surface of the layered structure. The lens is of progressive addition type and the surface lens has curvature at a near vision point higher than a curvature of said lens surface at a far vision point, and wherein step /b/ is carried out so that, between steps /b/ and /c/, the layered structure has a curvature greater than the curvature of the lens surface at the far vision point.

The process may also include one or more of the following additional features and/or steps: The circular-polarizing layer comprises a quater-wave retarding layer and a linear-polarizing layer, with a slow axis of said quater-wave retarding layer and a polarization axis of the linear-polarizing layer forming an angle comprised between 42 and 48 degrees, or between 132 and 138 degrees, and the layered structure being oriented in steps /d/ and /e/ so that light impinging onto the convex surface of the of the lens passes first through the quater-wave retarding layer and then the linear-polarizing layer. The layered structure comprises the following layer sequence: protective film/linear-polarizing layer/protective film/adhesive film/quater-wave retarding layer. The layered structure further comprises at least one functional coating on said second surface of the layered structure. The protective films are derived from cellulose triacetate. The protective films have a thickness in the range of 75 to 85 micrometers. The linear-polarizing layer is PVA-derived. The linear-polarizing layer has a thickness in the range of 25 to 50 micrometers. The quater-wave retarding layer is derived from material selected from a set of materials including polycarbonate, cyclo-olefins polymers and co-polymers, norbornene, polyamide, polymethylmethacrylate (PMMA), polyethyleneterephtalate (PET), cellulose-triacetate (TAC) and cellulose acetate-butyrate (CAB). The quater-wave retarding layer has a thickness in the range of 10 to 200 micrometers. The quater-wave retarding layer comprises polycarbonate having a thickness in the range of 50 to 100 micrometers.

These and other aspects of the invention will become apparent from the non-limiting implementations described hereafter in reference to the following drawings:

BRIEF DESCRIPTION OF THE DRAWINGS

In theses figures, identical reference numbers refer to identical elements. Furthermore, for clarity reason, the sizes of the represented elements do not correspond to sizes of actual elements.

DETAILED DESCRIPTION

Figure 1A:
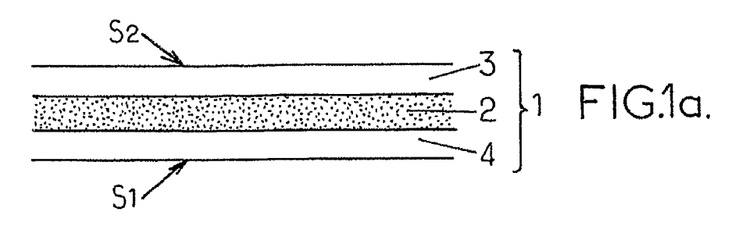
FIGS. 1a and 1b are cross sectional views of a layered structure and a lens, respectively, which can be used for implementing the invention.

FIG. 1a illustrates a layered structure 1 which may be used for providing a lens with a polarizing effect. Such structure is used for illustrative purpose, and it will be understood that the invention can be implemented whatever the optical property of the layered structure.

The structure 1 comprises a polarizing film 2, which can be derived from polyvinyl alcohol (PVA) or polyethylene terephthalate (PET). The thickness of film 2 may be comprised between 5 µm (micrometer) and 200 µm. It may be equal to about 40 µm, for example. Structure 1 may also comprise at least one protecting film disposed on one side of film 2. Such protecting film ensures that no scratch is made in film 2 during handling. Advantageously, structure 1 comprises two protecting films 3 and 4 which are disposed on either side of film 2. The protecting films 3 and 4 may be derived from cellulose triacetate (TAC) or cellulose acetate butyrate (CAB), and may be 150 µm in thickness, for example. Structure 1 is initially of planar shape, and S1 and S2 refer to the opposite parallel surfaces of structure 1.

Figure 1B:
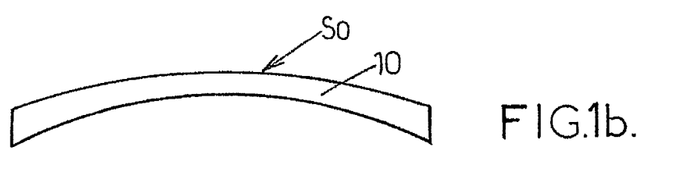
Figure 1C:
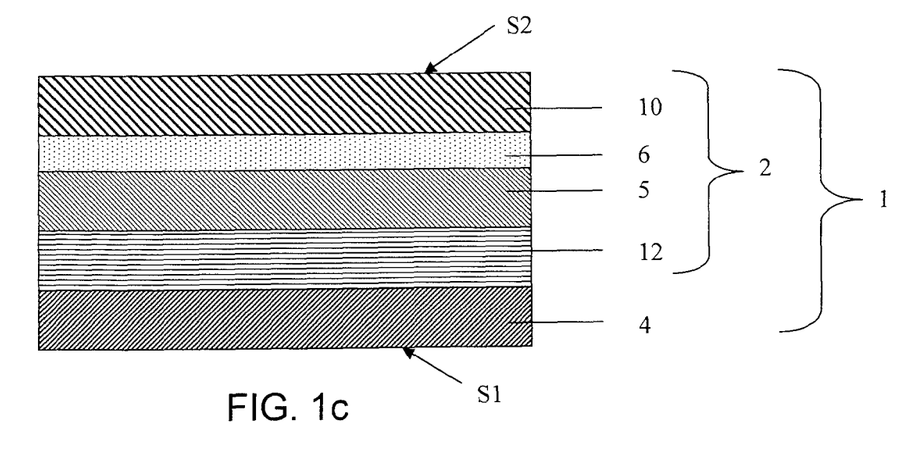
FIG. 1c is a cross sectional view of the layered structure of FIG. 1 illustrating details of the polarizing film layer.

Referring to FIG. 1c, in some embodiments, the lens is an ophthalmic lens and the layered structure 1 includes a circular-polarizing layer 2 efficient for at least one wavelength of visible light, the process comprising the steps: /a/ to /e/. The layered structure 1 including the circular-polarizing layer 2 is suitable for providing that the lens after step /e/ is capable of filtering a light based on a circular polarization of said light.

The circular-polarizing layer 2 comprises itself a quater-wave retarding layer 10 and a linear-polarizing layer 12, with a slow axis of said quater-wave retarding layer 10 and a polarization axis of the linear-polarizing layer 12 forming an angle comprised between 42 and 48 degrees, or between 132 and 138 degrees. The layered structure 1 is oriented in steps /d/ and /e/ so that light impinging onto the convex surface of the lens passes first through the quater-wave retarding layer 10 and then the linear-polarizing layer 12.

In some embodiments, the layered structure 1 includes the following layer sequence: protective film 4/linear-polarizing layer 12/protective film 5/adhesive film 6/quater-wave retarding layer 10/protective film 3.

The protective films 4, 5 are derived from cellulose triacetate, and have an exemplary thickness of 75 to 85 micrometers.

The linear-polarizing layer 12 is PVA-derived and has an exemplary thickness of 25 to 50 micrometers.

As used herein, a quater-wave retarding layer is a birefringent layer which produces a quater-wave retarding effect for at least one visible wavelength. The quater-wave retarding layer 10 is derived from material selected in the list comprising polycarbonate, cyclo-olefins polymers and co-polymers, norbornene, polyamide, polymethylmethacrylate (PMMA), polyethyleneterephtalate (PET), cellulose-triacetate (TAC) and cellulose acetate-butyrate (CAB). The quater-wave retarding layer 10 has an exemplary thickness of 10 to 200 micrometers, in particular 50 to 100 micrometers, for polycarbonate.

Advantageously, the quater-wave retarding layer 10 considered in the present invention corresponds to a retarding length of between 100 and 200 nanometers, where the retarding length is the product of the layer thickness with the difference between both principal index values of the birefringent material.

FIG. 1b illustrates an ophthalmic lens 10, preferably before it has been cut to size for a particular spectacle frame. Then, such lens 10 is currently about 6 cm in diameter and may be of any material currently uses for ophthalmic lenses, i.e. mineral, organic or composite material. For example, lens 10 may comprise a portion of a material based on at least one polycarbonate compound, at least one polyamide compound, diethylene glycol-bis(allyl carbonate) polymers or copolymers, thiourethane polymers or copolymers, or episulfide polymers or copolymers. More specifically, the invention is easily implemented when lens 10 comprises one or more polymers selected from polycarbonates, polyamides, polyimides, polysulfones, polyethylene terephthalate and polycarbonate copolymers, polyolefins, especially polynorbornenes, diethylene glycol-bis(allyl carbonate) polymers—known as CR39—and copolymers, (meth)acrylic polymers and copolymers, especially (meth)acrylic polymers and copolymers derived from bisphenol A, thio(meth)acrylic polymers and copolymers, urethane and thiourethane polymers and copolymers, epoxy polymers and copolymers, and episulfide polymers and copolymers.

Lens 10 may be of any optical type. For example, it may be an ametropy-correcting lens or a no-corrective lens like for example a solar protective lens. In particular, it may be unifocal, bifocal, trifocal or a progressive addition lens.

Lens 10 has a convex surface S0, which corresponds to the front face of the lens when used by an eyeglass wearer. Structure 1 is cut to size corresponding to the lens surface S0, but preferably it is cut to a size which is a bit larger than surface S0.

Figure 2A:
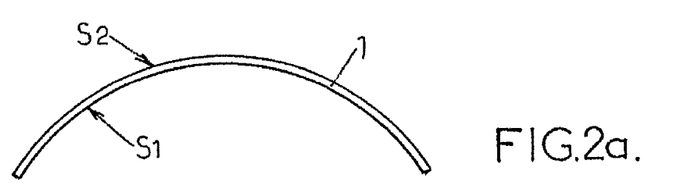
FIGS. 2a and 2b illustrate two steps of a process according to the present invention, before the layered structure is applied on the lens.

The layered structure 1 is first thermoformed so that it becomes curved, for example with roughly spherical shape. Such thermoforming may be carried out using a well known process, such as that described in United States patent application published under number US 2005/0121835. When structure 1 is cooled again after thermoforming, it has a permanent curved shape with a concave surface and a convex surface. For example, surface S1 is concave and surface S2 is convex (FIG. 2a).

Figure 2B:
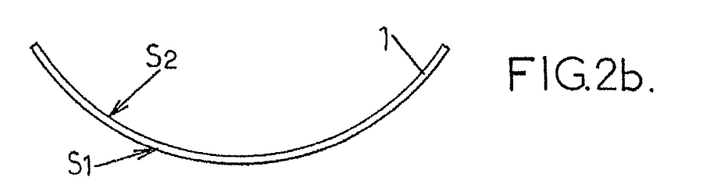

The curvature of the layered structure 1 is then inverted. Such inversion may be performed manually or for example by using an inflated membrane, by pressing on the convex surface S2 in a middle part of it. FIG. 2b represents the shape of structure 1 after its curvature has been inverted.

Figure 3A:
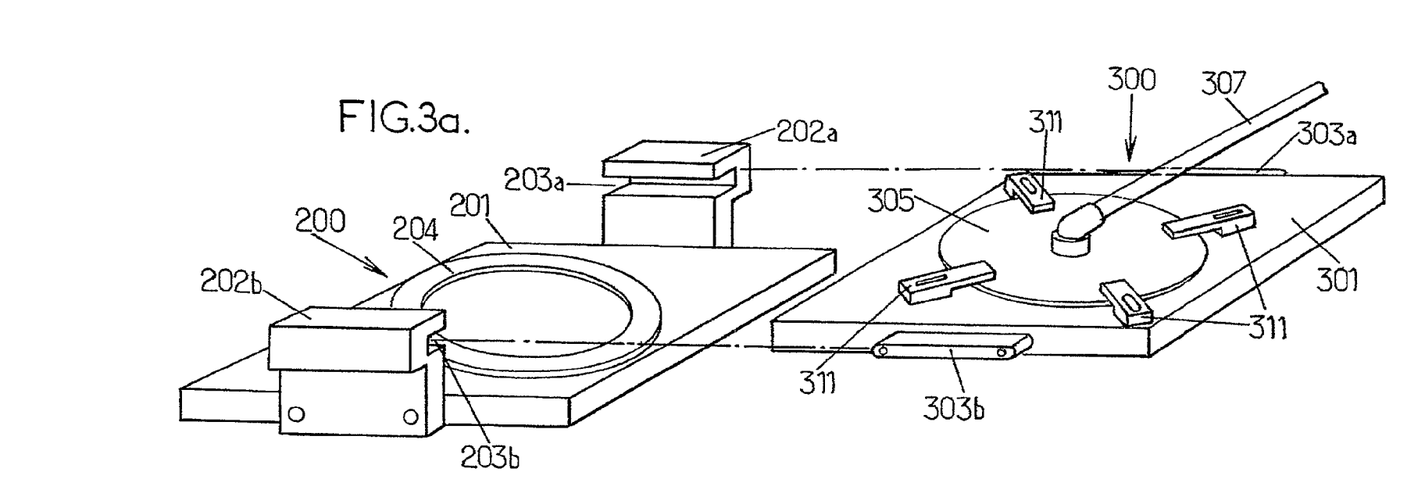
FIGS. 3a and 3c are perspective views of an application device which may be used for implementing the invention.
Figure 3B:
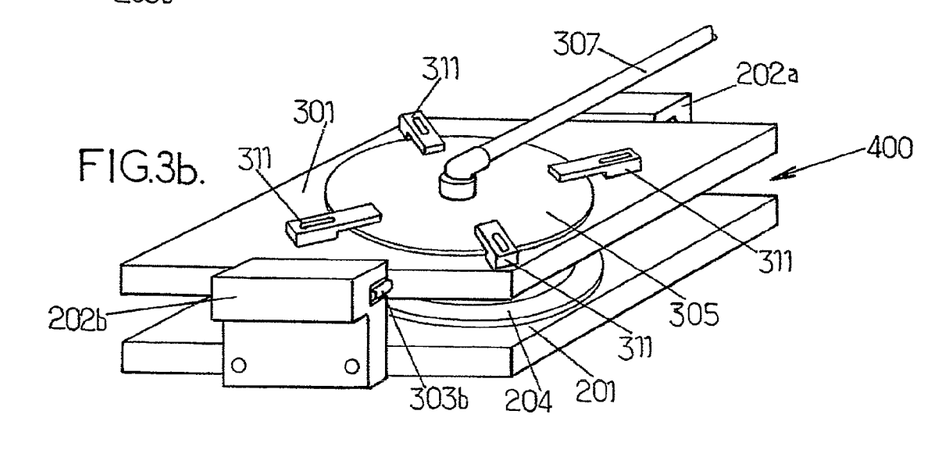
Figure 3C:
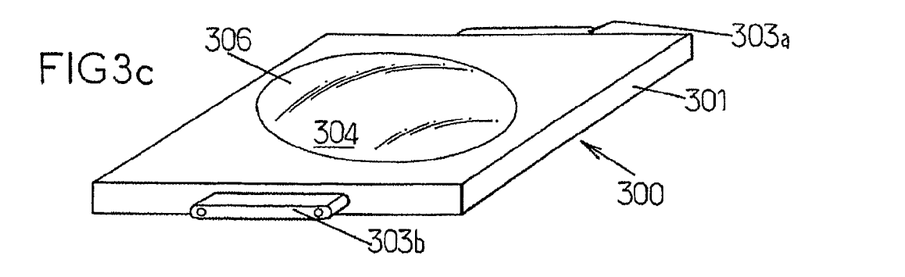

FIGS. 3a-3c illustrate a device that can be used for applying the layered structure 1 onto the lens 10. According to FIG. 3a, the system comprises a lower part 200 and an upper part 300. The lower part 200 comprises a main body 201 which is equipped with two lateral flanges 202a and 202b. The flanges 202a and 202b are provided with grooves 203a and 203b. Part 300 comprises a main body 301 which is equipped with lateral rails 303a and 303b, in order to allow the parts 200 and 300 to be simply joined together by the rails 303a and 303b moving along the grooves 203a and 203b, which form sideways. FIGS. 3a and 3b show parts 200 and 300 in a displaced configuration and in an assembly configuration, respectively. When joined together, parts 200 and 300 form a gap 400 of predetermined height.

Part 200 also comprises a lens holder 204 which is located in a middle part of main body 201, between the flanges 202a and 202b. The holder 204 may be integral with main body 201.

Figure 4A:
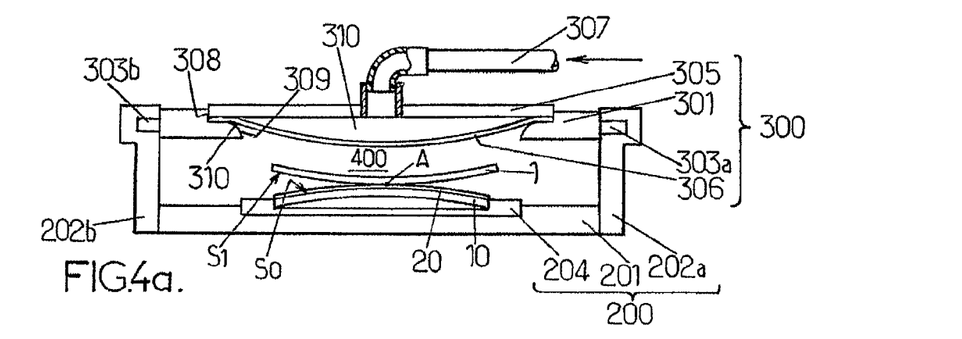
FIGS. 4a-4d illustrate the application step of a process according to the present invention.

FIG. 3c shows the upper part 300 viewed from below with reference to FIG. 3a. Main body 301 of part 300 is provided with an opening 304 which is larger than the size of lens 10. A closure part 305 (FIG. 3b) is fitted in main body 301 from upwards for closing opening 304. A resilient membrane 306 is pinched between main body 301 and part 305 around opening 304. The closure part 305 is held tight-clamped against main body 301, while pinching the membrane 306 in a sealed manner, by screwed brackets 311. The membrane 306 and the closure part 305 thus form a sealed cavity 310 (FIG. 4a). The closure part 305 is provided with gas inlet means 307, for introducing a pressurized gas into cavity 310. These inlet means 307 comprise an external duct part for connection to a pressurized gas source (not shown). The main body 301 has a straight bore 308 around the opening 304, suitable for keeping the closure part 305 in a centered position with respect to the opening 304. It also includes a conical surface part 309 for guiding a deformation of the membrane 306 through the opening 304. A curved connecting surface 310 connects the bore 308 to the conical surface part 309.

FIGS. 4a-4d are cross-sectional views showing parts 200 and 300 in the assembly position. Then, holder 204 is in a centered position under the opening 304, with gap 400 of fixed height between them. Use of the device is now detailed, in reference to these figures.

When parts 200 and 300 are separated, the lens 10 is placed on the holder 204 with the convex surface S0 facing upwards. A layer 20 of adhesive material has been previously deposited on the lens surface S0. Thickness of layer 20 may be about 25 μm and the adhesive material is preferably of pressure-sensitive type (PSA for Pressure-Sensitive Adhesive). Any other type of adhesive material may be used alternatively, which makes it possible to retain the layered structure 1 on the lens surface S0. For example it is possible to use thermal adhesive, UV-curable adhesive, hot-melt adhesive, or latex adhesive. Alternatively, the adhesive material layer 20 may be deposited on the surface 51 of the layered structure 1. In some cases, depending of the adhesive material used, respective layers of adhesive material may be deposited on both surfaces S0 and S1. Layer 20 may be deposited on lens 10 or/and on structure 1 using any process known in the art, such as spin coating for example.

Using a pressure-sensitive adhesive (PSA) is particularly advantageous since the layered structure 1 is permanently retained on the lens 10 in a simple and inexpensive manner, without impairing the optical properties of both the lens and the structure. In particular, no irradiation, such as ultraviolet irradiation, nor intensive heating is required for obtaining a permanent bonding with a pressure-sensitive adhesive. All pressure-sensitive adhesives exhibit permanent tack and have a low elastic modulus at room temperature, typically between $10^3$ and $10^7$ Pa (pascals). It is pointed out that the adhesion mechanism involved with pressure sensitive adhesives does not involve chemical bonding, but it is based on special viscoelastic properties of pressure-sensitive adhesives. These properties intrinsic to each pressure-sensitive adhesive formulation make it possible to create electrostatic Van der Waals interactions at the bonding interface. This occurs when a pressure-sensitive adhesive is brought into contact with a solid material with pressure. The pressure and the low modulus of the pressure-sensitive adhesive create intimate contact of this latter at a molecular scale with the topology of the solid material. Moreover, bulk viscoelastic properties of the pressure-sensitive adhesive lead to dissipation, within the thickness of the adhesive layer, of the energy resulting from mechanical stressing of the bonding interface. Therefore the interface can withstand pull-strengths and debonding mechanisms.

In addition, pressure-sensitive adhesives can be deposited in the form of a thin layer with uniform thickness. Such thickness may be comprised between 0.5 and 300 μm. Then, image formation through the lens 1 is not impaired by the layer of pressure-sensitive adhesive and the optical power of the lens is not altered. In particular, the assembly of the lens with the layered structure is compatible with the precision that is required when the lens is of progressive addition type.

Several pressure-sensitive adhesives may be used in a process according to the invention. Advantageously, the pressure-sensitive adhesive is selected from a compound based on a polyacrylate, a styrene-based block copolymer and a blend incorporating a natural rubber. Non-limiting examples of pressure-sensitive adhesives have general compositions based on polyacrylates, in particular polymethacrylates, or based on ethylene copolymers, such as ethylene vinyl acetate, ethylene ethyl acrylate and ethylene ethyl methacrylate copolymers, or on synthetic rubber and elastomers, including silicones, polyurethanes, styrene-butadienes, polybutadienes, polyisoprenes, polypropylenes, polyisobutylenes, or based on polymers containing nitrites or acrylonitriles, or on polychloroprene, or on block copolymers that include polystyrene, polyethylene, polypropylene, polyisoprene, polybutadiene, on polyvinylpyrrolidone or vinylpyrrolidone copolymers, or are blends (with continuous or discontinuous phases) of the above polymers, and also may comprise block copolymers obtained from the above-listed compounds. These pressure-sensitive adhesives may also include one or more additives selected from tackifiers, plasticizers, binders, antioxidants, stabilizers, pigments, dyes, dispersing agents and diffusing agents. For implementing the invention, using a pressure-sensitive adhesive which is polyacrylate-based is particularly preferred.

The layered structure 1 is placed on top of lens 10, with surface S1 of the layered structure facing surface S0 of the lens. Since surfaces S0 and S1 are both convex at this moment, surface S1 of structure 1 is in contact with surface S0 of the lens 10 in a very little zone, which is virtually reduced to a single point, noted A on FIG. 4a. The surface S0 of the layered structure 1 may be also progressively approached to the surface S1 of the lens. This embodiment presents the advantage to control the contact point between S0 and S1.

Figure 4B:
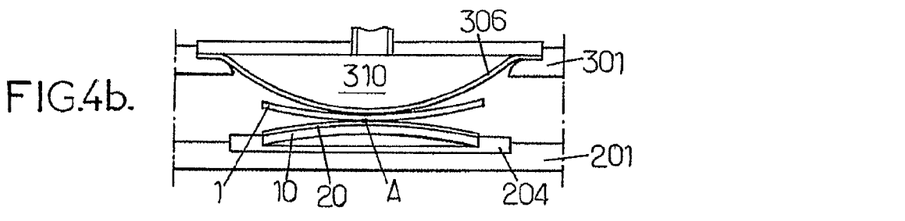

Then part 300 is joined with part 200 via the rails 303a and 303b sliding into the grooves 203a and 203b, without moving the lens 10 and the structure 1. The membrane 306 is then progressively inflated so that it comes into contact with the concave surface S2 of the layered structure 1 above point A (FIG. 4b). As gas pressure within cavity 310 is further increased, membrane 306 pushes structure 1 against surface S0 of lens 10 with a contact zone which is gradually increasing. This contact zone is noted $Z_{CONTACT}$ on FIG. 4c. Within zone $Z_{CONTACT}$, structure 1 conforms with the shape of the convex lens surface S0, so that surface S1 of structure 1 is concave within zone $Z_{CONTACT}$. Out of zone $Z_{CONTACT}$, membrane 306 is not yet in contact with surface S2 of structure 1, so that surface S1 of the structure 1 is still convex out of zone $Z_{CONTACT}$. S0 surface S1 locally turns from convex shape to concave shape at the border of zone $Z_{CONTACT}$, at the same time this border moves towards the peripheral edge of lens 10. Finally, for enough gas pressure in cavity 310, structure 1 is applied on the lens 10 over the whole surface S0 (FIG. 4d). Surface S1 of structure 1 is then concave again over its entire area, and structure 1 therefore exhibits a curved shape with curvature direction similar to that resulting from thermoforming and represented in FIG. 2a.

Gas pressure is then released in cavity 310, part 300 is disassembled from part 200 and lens 10 is recovered with structure 1 stuck thereon.

Figure 4C:
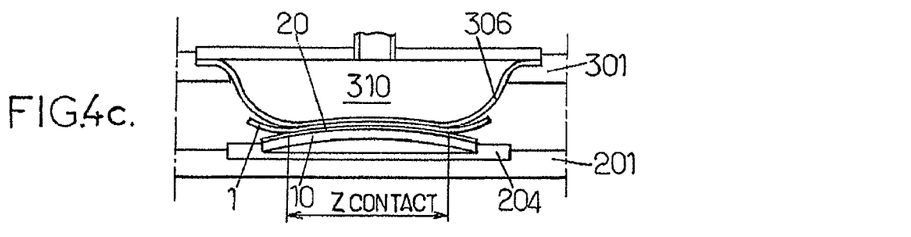
Figure 4D:
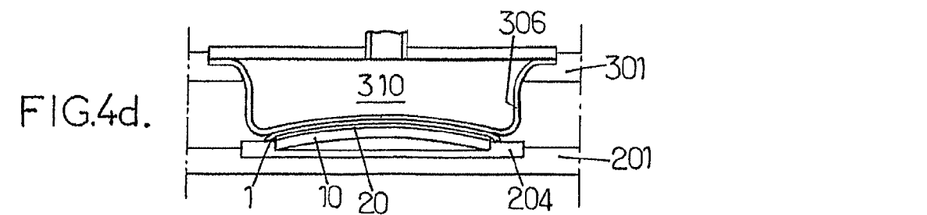

Preferably, structure 1 has been heated before being placed on top of lens 10 (FIG. 4a), so that it is softer when progressively pressed between membrane 306 and lens 10 (FIGS. 4b-4d). The temperature of structure 1 is preferably higher than 75.degree. C. This temperature may be selected depending on the materials of the layered structure 1, for example in relation with their glass temperature Tg, so that the layered structure 1 can accommodate temporary stresses without forming defects.

Table I below indicates process parameters that have been used when implementing the process that has just been described. Geometrical features of the lens surface S0 are indicated in the first column. For progressive lenses, FV and NV denote the curvature radii of surface S0 at the far vision point and at the near vision point, respectively. The second column indicates the mean curvature of structure 1 after thermoforming. All samples corresponding to the lines of this table were defect-free after assembly, and exhibit an optical quality suitable for ophthalmic use.

TABLE I

| Surface S0 of lens 10: curvature radius | Curvature radius in mm of structure 1 after thermoforming | Temperature of structure 1 during application on lens 10 |
| --- | --- | --- |
| Constant = 111.6 mm | 88.3 mm | ambient |
| FV: 141.3 mm NV: 73.3 mm | 88.3 mm | ambient |
| FV: 302.9 mm NV: 111.6 mm | 88.3 mm | ambient |
| FV: 66.2 mm NV: 60.6 mm | 45.6 mm | 100° C. |
| FV: 66.2 mm NV: 60.6 mm | 49.9 mm | 80° C. |
| FV: 66.2 mm NV: 46.1 mm | 45.6 mm | 100° C. |
| FV: 66.2 mm NV: 46.1 mm | 45.6 mm | 80° C. |
| FV: 66.2 mm NV: 44.2 mm | 53.75 mm | 80° C. |

The implementation of the invention that has been described in details may be adapted or modified in order to comply with any special conditions. All numeral values and materials that have been cited for each element were only for illustrating purpose. For example, depending on the material of layer 2, structure 1 may include no protecting layer. In addition, layered structure 1 may further include functional coatings on surface S2 such as, for example, an antireflective coating, antisoiling coating, antifogging coating, antiabrasion coating, antistatic coating or a combination thereof. Then, lens 10 is provided at same time with the optical function of film 2 and with the effect of the functional coating. Such combination results in time saving for the manufacturing process of the complete lens.

In some embodiments, a pair of spectacles is provide that include a frame and two lenses obtained by implementing the above described process wherein each one of the lenses is capable of transmitting light with initial circular polarization opposed to that of the other lens. The pair of spectacles is suitable for TV watching with stereoscopic vision with image selection based on circular light-polarization. As used herein, TV means any image display device comprising a display panel, including television devices, computer devices, videogame devices, phone devices, motion picture devices, etc, these devices being stationary or mobile. This definition also encompassed the use of a projection screen such as used in a movie theater.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed is:

1. Process for applying a layered structure on a convex surface of a lens, wherein the lens is an ophthalmic lens and the layered structure includes a circular-polarizing layer efficient for at least one wavelength of visible light, the process comprising the following steps:
   /a/ providing the layered structure with a planar shape;
   /b/ thermoforming the layered structure so that it becomes curved with a first surface being concave and a second surface being convex;
   /c/ inverting the curvature of the layered structure so that said first surface turns convex and said second surface turns concave;
   /d/ bringing the first surface of the layered structure in contact with the convex surface of the lens at an initial contact point; and
   /e/ starting from the initial contact point, applying the first surface of the layered structure against the convex surface of the lens via pressure applied on the second surface of the layered structure, the first and second surfaces of the layered structure turning back to concave shape and convex shape, respectively, at a peripheral border of an increasing contact zone.

2. Process according to claim 1, wherein the layered structure including the circular-polarizing layer is suitable for the lens such that after step /e/ the lens is capable of filtering a light based on a circular polarization of said light.

3. Process according to claim 1, wherein step /e/ is carried out so that substantially no pressure is applied on the second surface of the layered structure out of the increasing contact zone.

4. Process according to claim 1, wherein step /e/ is carried out with the layered structure heated.

5. Process according to claim 4, wherein a temperature of the layered structure is equal or at least 75° C. during step /e/.

6. Process according claim 1, wherein the surface lens has a curvature radius below 305 millimeters, preferentially below 100 millimeters, and particularly less than 75 millimeters.

7. Process according claim 1, wherein steps /d/ and /e/ are carried out with an adhesive layer provided between the convex surface of the lens and the first surface of the layered structure.

8. Process according to claim 7, wherein the adhesive layer is applied on the convex surface of the lens and/or on the first surface of the layered structure.

9. Process according to claim 7, wherein the adhesive layer comprises a material of pressure-sensitive adhesive type.

10. Process according to claim 1, wherein pressure is applied on the second surface of the layered structure during step /e/ via a resilient membrane being inflated and pressing on the second surface of the layered structure within the increasing contact zone.

11. Process according to claim 1, wherein step /b/ is carried out so that, between steps /b/ and /c/, a curvature of the layered structure at least one point in the first surface of said layered structure is greater than or equal to a curvature of the convex surface of the lens at a point in said convex surface of the lens which corresponds to said at least one point in the first surface of the layered structure after step /e/.

12. Process according to claim 11, wherein the convex surface of the lens has a constant curvature, and wherein step /b/ is carried out so that, between steps /b/ and /c/, the layered structure has a curvature greater than or equal to the curvature of the convex surface of the lens at any point in the first surface of the layered structure.

13. Process according to claim 11, wherein the lens is of progressive addition type and the lens has curvature at a near vision point higher than a curvature of said convex surface of the lens at a far vision point, and wherein step /b/ is carried out so that, between steps /b/ and /c/, the layered structure has a curvature greater than the curvature of the convex surface of the lens at the far vision point.

14. Process according to claim 1, wherein the circular-polarizing layer comprises a quarter-wave retarding layer and a linear-polarizing layer, with a slow axis of said quarter-wave retarding layer and a polarization axis of the linear-polarizing layer forming an angle comprised between 42 and 48 degrees, or between 132 and 138 degrees, and the layered structure being oriented in steps /d/ and /e/ so that light impinging onto the convex surface of the lens passes first through the quarter-wave retarding layer and then the linear-polarizing layer.

15. Process according to claim 14, wherein the layered structure comprises the following layer sequence: protective film/linear-polarizing layer/protective film/adhesive film/quarter-wave retarding layer.

16. Process according to claim 1, wherein the layered structure further comprises at least one functional coating on said second surface of the layered structure.

17. Process according to claim 15, wherein the protective films are derived from cellulose triacetate.

18. Process according to claim 15, wherein the protective films have a thickness in the range of 75 to 85 micrometers.

19. Process according to claim 15, wherein the linear-polarizing layer is PVA-derived.

20. Process according to claim 19, wherein the linear-polarizing layer has a thickness in the range of 25 to 50 micrometers.

21. Process according to claim 14, wherein the quarter-wave retarding layer is derived from material selected from a set of materials including polycarbonate, cyclo-olefins polymers and co-polymers, norbornene, polyamide, polymethylmethacrylate (PMMA), polyethyleneterephtalate (PET), cellulose-triacetate (TAC) and cellulose acetate-butyrate (CAB).

22. Process according to claim 21, wherein the quarter-wave retarding layer has a thickness in the range of 10 to 200 micrometers.

23. Process according to claim 22, wherein the quarter-wave retarding layer comprises polycarbonate having a thickness in the range of 50 to 100 micrometers.

* * * * *